May 5, 1953 — C. S. MOTTER — 2,637,613
KITCHEN CABINET FOR CORNER USE
Filed March 1, 1949 — 4 Sheets-Sheet 1

Inventor.
Charles S. Motter.
By Wilkinson, Huxley, Byron & Hume
Attys.

May 5, 1953  C. S. MOTTER  2,637,613
KITCHEN CABINET FOR CORNER USE
Filed March 1, 1949  4 Sheets-Sheet 2
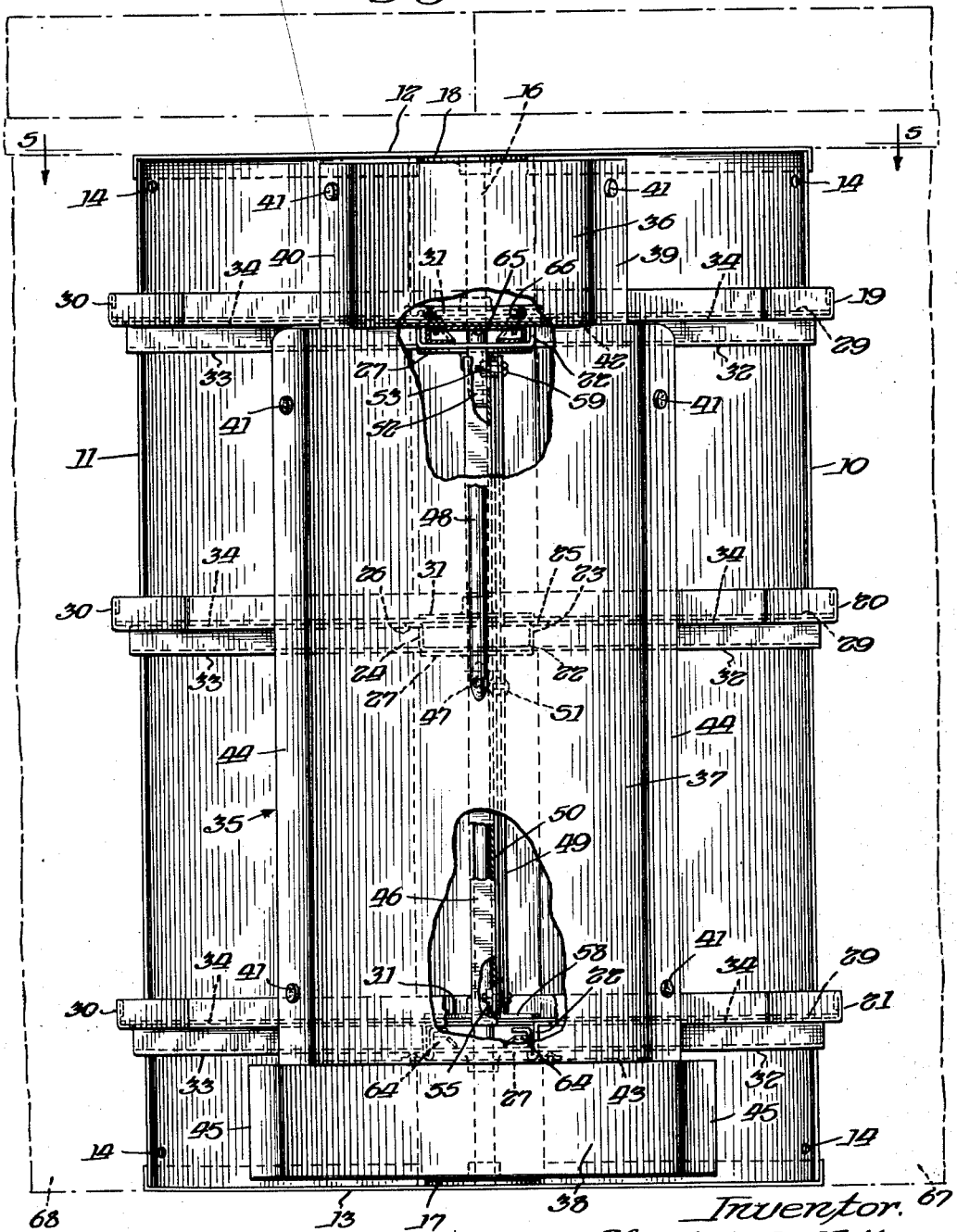
Inventor.
Charles S. Motter.
By Wilkinson Hurley Byron Humes
Attys.

May 5, 1953          C. S. MOTTER          2,637,613
KITCHEN CABINET FOR CORNER USE
Filed March 1, 1949                             4 Sheets-Sheet 3
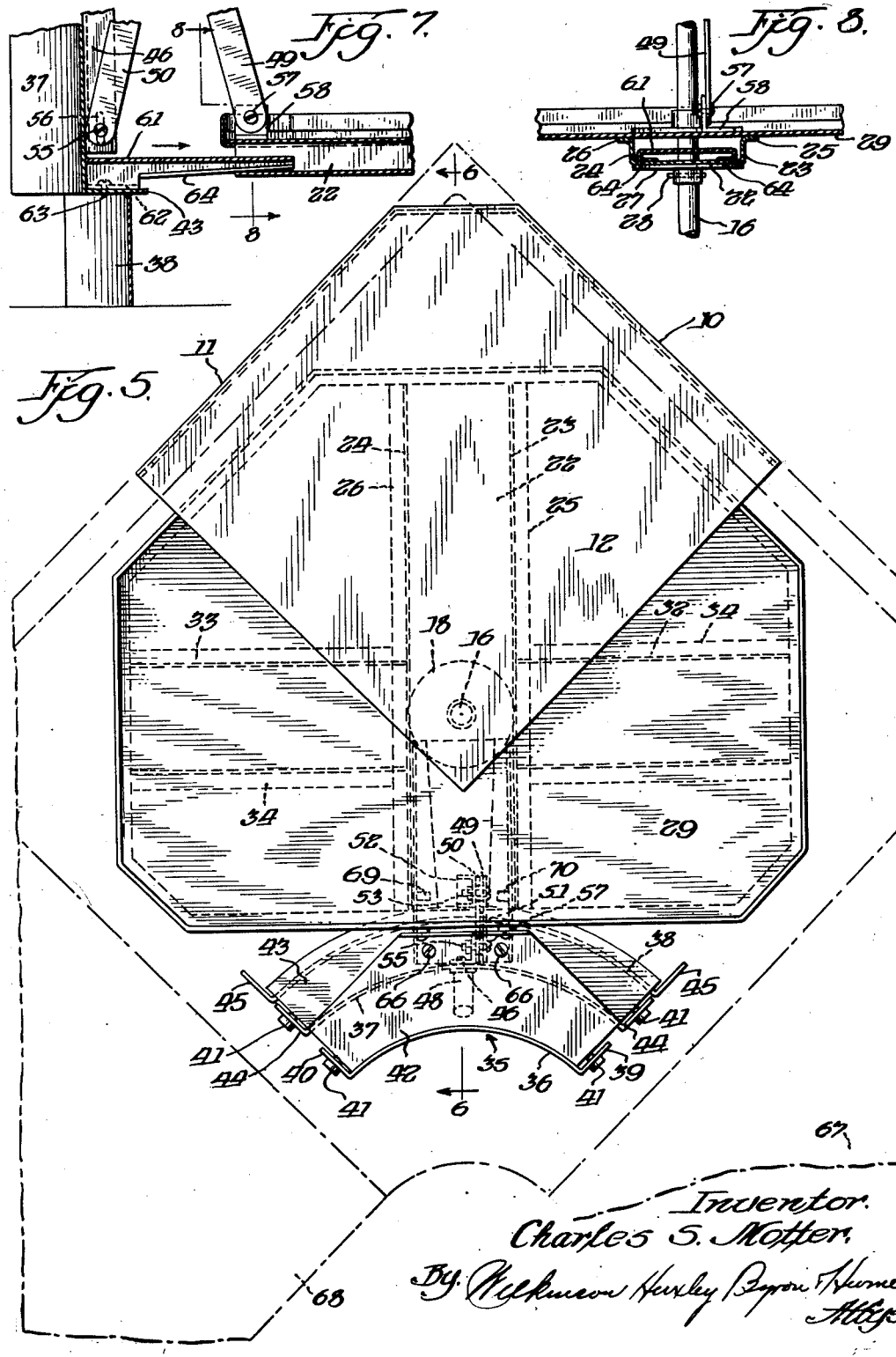
Inventor.
Charles S. Motter,
By Wilkinson Huxley Byron Hume
Attys.

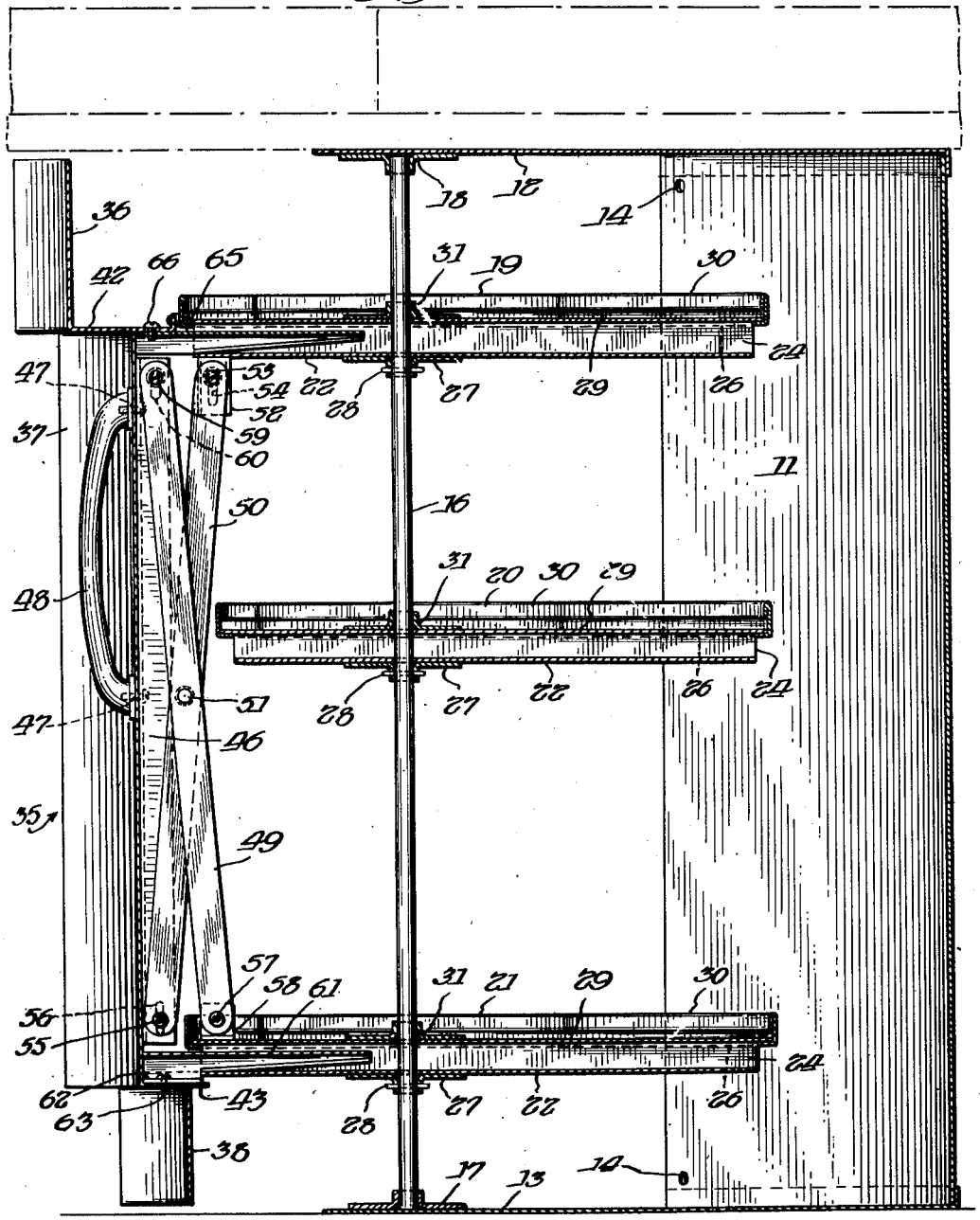

Patented May 5, 1953

2,637,613

UNITED STATES PATENT OFFICE 2,637,613

KITCHEN CABINET FOR CORNER USE

Charles S. Motter, Chicago, Ill., assignor to Morton Manufacturing Company, Chicago, Ill., a corporation of Illinois Application March 1, 1949, Serial No. 79,003

7 Claims. (Cl. 312—238)

My invention relates to a kitchen cabinet for corner use and has particular reference to a cabinet built for placement in the corner of a kitchen, usually equipped with base cabinets at each side of the corner cabinet although it is adapted to be fitted into various combinations, such as closed sinks, kitchen fillers and the like now in common use in the equipment of kitchens or other pieces of furniture having side walls.

Another and further object of my invention is the provision of a corner cabinet having rotatable shelves therein upon which food can be stored or various articles such as kitchen utensils or the like can be placed and space which has heretofore been of no use is converted into useful space in such manner that it can be utilized conveniently, effectually and quickly by the housewife.

Another and further object of my invention is the provision of a corner cabinet which is designed in such fashion that a pleasing external wall appearance is presented to conform in contour to the adjacent cabinets, so that a symmetrical appearance of the cabinets is maintained and means is provided for converting what heretofore has been useless space into space that is useful and convenient for use in a kitchen. In the installation of base cabinets, cabinet sinks and the like in kitchens the treatment of the corner of the kitchen where cabinets are used on adjacent walls has been one of the major problems in equipping kitchens with cabinets for food storage purposes, reception of kitchen utensils and the like, so as to bring together in a compact close area foods needed for cooking and the utensils needed in its preparation and the like.

It has been the practice heretofore to provide corner fillers which have a top conforming to the tops of the base cabinets and a front contour which also conforms to the front of the base cabinets, all of which is supported usually on a pedestal placed at the front of the corner cabinet and usually serving as a filler between the corners of the adjacent cabinets thereof, sealing off the space in the corner so that no value can be had to it for any purpose. This space thereupon collects dust and the like and because of its not being accessible is difficult to keep clean, odors are apt to result and up to the present time this treatment has not been at all satisfactory, all of which is remedied with my improved cabinet.

Another and further object of my invention is the provision of a cabinet having a plurality of spaced shelves therein upon which a closure member is mounted in such a manner that the shelves and the closure member can be rotated, thus bringing all portions of the shelves close to the opening formed between the corners of adjacent cabinets, so that a housewife can have easy access to the shelves.

These and other objects of my invention will be more fully and better understood by reference to the accompanying drawings and in which:

Figure 4 is an elevational view of the cabinet showing portions of the closure member broken away to illustrate the details of its operation;

Figure 5 is a top plan view on lines 5—5 of Figure 4;

Figure 6 is a vertical sectional view on line 6—6 of Figure 5;

Figure 7 is a detailed view showing the lower edge of the closure member and its mounting on the lowermost shelf; and Figure 8 is a sectional view on lines 8—8 of Figure 7.

Figure 1:
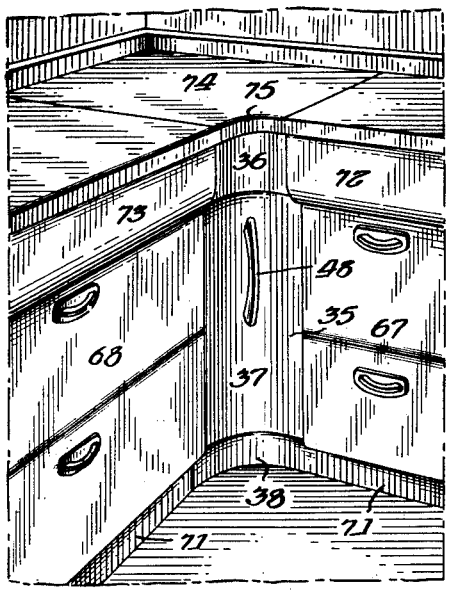
Figure 1 is an elevational view showing the kitchen cabinet in closed position in a corner between two base cabinets.
Figure 2:
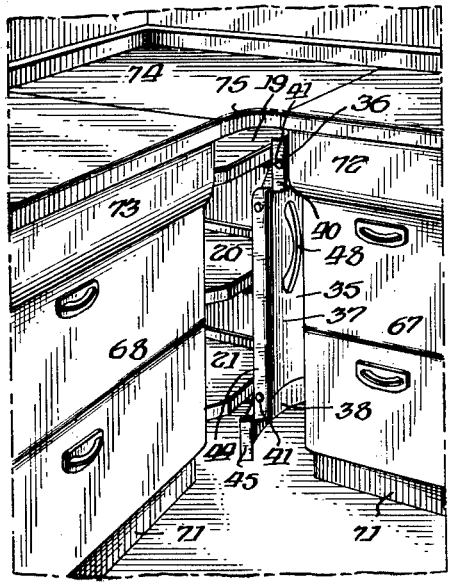
Figure 2 is a view similar to Figure 1 showing the corner cabinet in operating open position.
Figure 3:
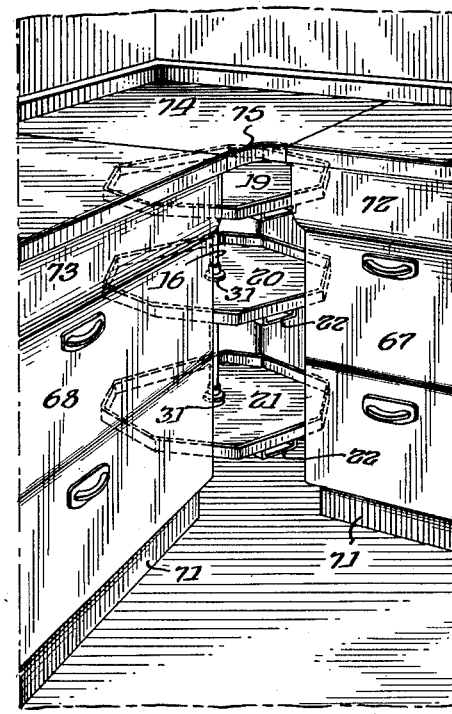
Figure 3 is a view similar to Figures 1 and 2 showing the cabinet in full open position.

Referring now specifically to the drawings and in which like reference characters refer to like parts throughout, a cabinet is shown consisting of two angularly disposed back wall members 10 and 11 in edge to edge relation with each other and preferably welded together, a top member 12 and a bottom member 13, these members being formed preferably of sheet metal or the like and are spot welded or secured together with any appropriate means.

Openings 14, 14 are formed in the back wall members 10 and 11 for the reception of screws or the like, which may be placed therethrough to anchor a member to a wall, if such anchor is desired, although it is not necessary to support the corner cabinet in place that it be anchored to the wall.

A vertical extending rotating shaft 16 is provided, which is mounted in a plate 17 at its lower end secured to the bottom member 13 and in a plate 18 at its upper end spot welded or otherwise secured to the top member 12, and is located adjacent the free corners of the top 12 and bottom 13. Spaced shelves 19, 20 and 21 are provided, each shelf comprising a U-shaped channel support section 22 having flange portions 23 and 24 thereon upon the edges of which are horizontal extending rib portions 25 and 26 at the outer edges thereof. These support sections 22 have centrally located holes therein through which the shaft 16 passes, and supporting collars 27 are provided which are secured to the shaft 16 by means of pins 28 with a shelf portion 29 being provided around which a rim 30 is placed to form the shelf, the rim 30 being turned under the outer edge of the shelf portion 29 and spot welded thereto, with the shelf portion 29 and the rib portions 25 and 26 of the flange 23 and 24 being spot welded together with an upper collar 31 being provided which is fitted around the shaft 16 and is in engagement with the upper surface of the shelf member 29.

A pair of channel sections 32 and 33 are provided, these cross members being of the same cross-sectional contour as the channel sections 22, with their inner ends abutting against the sides of the said channel sections 23 and have ribs 34, 34 thereon which are spot welded to the bottom of the shelf forming member 29, so that these units are held in unitary structural engagement with each other and providing a shelf which is fixed upon the shaft 16 and rotates therewith.

As shown in the drawings, an upper shelf 19 is provided along with a lower shelf 21 and an intermediate shelf 20. The structure of these shelves is exactly the same except that the intermediate shelf 20 does not extend quite as far to the front as does the upper shelf 19 and lower shelf 21 to provide clearance for the closure operating members hereinafter described.

A closure member designated as a whole as 35 is provided which consists of a top section 36, an intermediate section 37 and a bottom section 38, all of these sections being concave, when considered from the front of the cabinet. The top section 36 has wing portions 39 and 40 formed thereon which are angularly disposed to the section 36 and has rubber buttons 41, 41 mounted thereon. The top member 36 has a horizontal base portion 42 to which the central door section 37 is secured at its top by being spot welded thereto or otherwise secured in position and has an inwardly extending flange 43 at the bottom thereof to which the bottom section 38 of the closure member is secured. The closure member 37 has flanges 44, 44 thereon upon which rubber buttons 41, 41 are mounted, while the bottom member 38 has flanges 45, 45 thereon, each of these flanges coming into alignment with the side walls of adjacent cabinets when the closure member 35 is pulled outward to its full extended position. Vertically positioned against the inner face of the closure member 37 is an angle 46 which is held in position by a pair of bolts 47, 47 extending through the base of a handle member 48, thus holding the handle 48 in position and also holding the angle member in position against the inner face of this member supporting and strengthening the member 37 and preventing it from being distorted.

A pair of levers 49 and 50 are provided which are pivoted together at their centers by means of a bolt 51 with the lever 50 being secured to an angle 52 welded to the underside of the shelf supporting member 22 with a bolt 53 being provided fitted into a slot 54 in the angle 52, this lever at its lower end being secured to the angle 46 by means of a bolt 55 extending through a hole 56 in the lower end of this lever 50 and through a slotted opening in the angle 46. The lever 49 has a bolt 57 extending therethrough at its lower end and through an angle 58 spot welded to the upper surface of the shelf portion 29 of the lower shelf 21. At the upper end the lever 49 is secured to the upper end of the angle 46 by means of a bolt 59 extending through a slot 60 in the upper end of the angle 46, thus providing means for the mounting of the closure member 35 so as to close the space between two adjacent base cabinets, and its movement in and out of the two levers 49 and 50 forming a combination commonly known as "lazy tongs" for this purpose.

Because the openings at each end of the angle 46, and in the angle 52 are slotted, while the lever 49 at its lower end is pivotally mounted to the angle 58 by means of a bolt passing through ordinary holes in the angle 52 and the lever 49, the path of movement of the lever 49 is arcuate and as the closure member 35 moves toward the shelves the closure member 35 is lifted slightly so as to clear the floor as the shelves are rotated.

A triangular shaped lower guide 61 having a base portion 62 is provided which is secured at its base to the inturned flange 43 at the bottom of the intermediate door section 37 by means of bolts 63. This guide 61 being a channel section with its flanges inturned towards each other and rests upon the web portion of the support member 22, is narrower at its inner end in a vertical direction than at the outer end with inclined faces 64, 64 with the guide being fitted into the end of support member 22 with the angular side 64 in engagement with the web in this member 22 and sliding on the member 22 as the closure member 35 moves toward and away from the edges of the shelves 19, 20 and 21.

A similar guide 65 is provided at the upper end of the closure member which extends into a support member 22 on the upper shelf 19 in the same fashion as heretofore described with respect to the guide 62 at the lower end of the closure member and is secured to the flange 42 by means of bolts 66, 66. The purpose of these guides 61 and 65 is to assist in lifting the closure member 35 free of the floor when the closure member 35 is in position against the shelves, as shown particularly in Figure 6, so the shelves can be rotated without the closure member 35 dragging on the floor. The angularity of the faces of these guides 61 and 65 is proportionate to the distance of lift of the lever 49 upon the closure 35 as it moves toward the shelves, and the corresponding drop in this closure member as it is moved away from the shelves. When the closure member 35 is pulled out into extended position the edge of the closure member 38 rests on the floor as shown in Figure 7, completely closing the opening between two adjacent base cabinets or the like, such as a base cabinet 67 and a second base cabinet 68 placed adjacent thereto. A pair of bullet catches 69 and 70 are provided which are mounted on the flanges 23 and 24 of the support member 22 for the top shelf 19 and engage in recesses formed in the sides of the guide 65 and which hold the closure member 35 in place when the closure member is positioned inward against the shelves so the shelves can be freely rotated.

In operation the corner cabinet is normally mounted between the two base cabinets 67 and 68, these cabinets having set in bottom walls 71, 71 and either drawers or doors intermediate the top and bottom, which project out farther than the lower section 29, but normally not quite so far out as the top drawers 72 and 73 on the cabinets 67 and 68. These sections correspond generally to the upper section 36 on the closure member for the corner cabinet heretofore described. A top section 74 is provided having a curved forward edge 75, this unit conforming to the tops of the cabinets 67 and 68 and may or may not be supported on the corner cabinet. If supported on the corner cabinet, it would rest on the upper wall 12 and extend forward thereof to engage in abutting arrangement against the tops of the adjacent cabinets 67 and 68. Usually these tops are independently supported with proper mounting means, but in any event a smooth upper surface is provided, which forms a work surface, a receptacle surface or the like.

When base cabinets are positioned against adjacent walls, they must be spaced with respect to each other else there is interference with the opening and closing of the doors and drawers of these cabinets. This space depends somewhat upon the design of the builder, but normally they should be spaced so that there is a space of some eight or ten inches between the corners of these adjacent cabinets. This space is sufficient to allow easy access to the space and the cabinets as designed, provided the closure member 35 is of a sufficient width to close the space between adjacent cabinets, so that a symmetrical and clean contoured surface is externally presented.

In the operation of the corner cabinet, when the housewife wants to fill the shelves, she grasps the handle 48, pushes the handle inward until the bullet catches engage to hold the closure 35 adjacent the shelves in which position the shelves can be rotated and filled with can goods or whatever materials she may desire to place in the cabinet. An ordinary system corner cabinet with three shelves will hold something like two and a half cases of canned goods. The rotation of the shelves brings all of the edges of these shelves toward the opening, so that they can easily be filled and when the housewife desires to close the cabinet, the shelves are turned so that she can grasp the handle and rotate it so that it is approximately in the center, pulls outward on the handle and due to the side flanges 39 and 40, 41 and 45, engaging against the side walls of the adjacent cabinets 67 and 68, the closure member 35 is automatically centered and at the same time is lowered because as the closure member is pulled outward and it is lowered because of the angular faces of the guides 61 and 65, so that a complete closure of the cabinet opening is provided. When it is desired to clean the surface of the floor with a mop or the like the closure 35 is pushed inward and the lower shelf is sufficiently above the lower level so that access can be had underneath the cabinet for cleaning purposes and the like.

While I have described more or less precisely the details of construction, I do not wish to be understood as limiting myself thereto, as I contemplate changes in form and the proportion of parts and the substitution of equivalents as circumstances may suggest or render expedient without departing from the spirit or scope of my invention.

What is claimed is:

1. A corner kitchen cabinet comprising in combination a cabinet shell consisting of top and bottom portions and a wall portion connecting the said top and bottom portions, a vertical shaft mounted in the top and bottom portions, rotatable spaced shelves on said vertical shaft, a closure member, levers connected to certain of said shelves and to the said closure member whereby the closure member is adapted to be moved toward and away from the said shelves.

2. A corner kitchen cabinet comprising in combination a cabinet shell consisting of top and bottom portions and a wall portion connecting the said top and bottom portions, a vertical shaft mounted in the top and bottom portions, rotatable spaced shelves on said vertical shaft, a closure member, a pair of compound levers connected to certain of said shelves and to the said closure member whereby the closure member is adapted to be moved toward and away from the said shelves.

3. A corner kitchen cabinet comprising in combination a cabinet shell consisting of top and bottom portions and a wall portion connecting the said top and bottom portions, a vertical shaft mounted in the top and bottom portions, rotatable spaced shelves on said vertical shaft, a closure member, a pair of levers partially connected at their central portion and to certain of said shelves at one of their ends and to the said closure member at the other, whereby linear movement of the said closure member is permitted.

4. A corner kitchen cabinet comprising in combination a cabinet shell consisting of top and bottom portions and a wall portion connecting the said top and bottom portions, a vertical shaft mounted in the top and bottom portions, rotatable spaced shelves on said vertical shaft, a closure member, levers connected to certain of said shelves and to the said closure member whereby the closure member is adapted to be moved toward and away from the said shelves and guides secured to said closure member and in engagement with the said shelves whereby the closure member is raised as the closure member is moved toward the shelves and lowered as it moves away from the said shelves.

5. A corner kitchen cabinet comprising in combination a cabinet shell consisting of top and bottom portions and a wall portion connecting the said top and bottom portions, a vertical shaft mounted in the top and bottom portions, rotatable spaced shelves on said vertical shaft, a closure member, levers connected to certain of said shelves and to the said closure member whereby the closure member is adapted to be moved toward and away from the said shelves and triangular shaped guides secured to said closure member and in engagement with the said shelves whereby the closure member is raised as the closure member is moved toward the shelves and lowered as it moves away from the said shelves.

6. A corner kitchen cabinet comprising in combination a support cabinet having a top and bottom portion and an angularly disposed rear wall, a rotating shaft mounted in said top and bottom portions, a plurality of shelf supports in spaced relation with each other mounted on said shaft, shelves on said supports, a closure member, a pair of levers pivotally connected at their centers and at one side to the shelf supports and at the other to said closure member and guides having angular sides secured to the closure member at their outer ends and extending into engagement with the shelf support members whereby as the closure member is moved towards the shelves it is raised and is lowered as it moves away from the shelves.

7. In a corner kitchen cabinet comprising in combination a support cabinet having a top and bottom portion and an angularly disposed rear wall, a rotating shaft mounted in said top and bottom portions, a plurality of shelf supports in spaced relation with each other mounted on said shaft, shelves on said supports, a curved closure member, a pair of levers pivotally connected at their centers and at one side to the shelf supports and at the other to said closure member and guides having angular sides secured to the closure member at their outer ends and extending into engagement with the shelf support members whereby as the closure member is moved towards the shelves it is raised and is lowered as it moves away from the shelves.

CHARLES S. MOTTER.

References Cited in the file of this patent

UNITED STATES PATENTS

| Number | Name | Date |
|---|---|---|
| D. 141,017 | Stanitz | Apr. 24, 1945 |
| 38,473 | Durand | May 12, 1863 |
| 1,053,384 | Harlan | Feb. 18, 1913 |
| 1,468,108 | Hodges | Sept. 18, 1923 |
| 2,239,734 | Pratt | Apr. 29, 1941 |
| 2,452,375 | Hirshbergh | Oct. 26, 1948 |

OTHER REFERENCES

Patten: Abstract No. 9835, published May 1, 1951.